May 19, 1959

R. LUCIEN 2,887,125

ELECTRO-VALVE DISTRIBUTOR

Filed April 23, 1956

May 19, 1959    R. LUCIEN    2,887,125
ELECTRO-VALVE DISTRIBUTOR
Filed April 23, 1956    2 Sheets-Sheet 2

United States Patent Office 2,887,125
Patented May 19, 1959

2,887,125

ELECTRO-VALVE DISTRIBUTOR

Rene Lucien, Neuilly sur Seine, France, assignor to Societe a Responsabilite Limitee Recherches-Etudes-Production R.E.P., Paris, France, a corporation of France Application April 23, 1956, Serial No. 580,119

Claims priority, application France March 16, 1956

3 Claims. (Cl. 137—623)

This invention relates to electromagnetically controlled valves and, more particularly, to valves which, for example, couple a source of fluid under pressure selectively to a utilization device or to a reservoir.

It is an object of the invention to provide an improved valve, the construction and manufacture of which are very simple.

It is a further object of the invention to provide an improved valve, the size of which can be extremely small.

Another object of the invention is to provide an improved valve which is readily used in combination with an automatic braking control device such as the type disclosed in my co-pending application, Serial No. 580,120 filed April 23, 1956, now Patent No. 2,840,715.

In achieving the above objectives, the invention provides a valve distributor for selectively coupling first, second and third orifices. The valve distributor comprises a body defining a bore having opposite extremities coupled to the first and second orifices and a central portion coupled to the third orifice. In the bore are provided spaced discs on opposite sides of the third orifice. These discs define substantially aligned circular openings. A first ball is positioned in the bore and between the discs and has a diameter exceeding the diameters of the openings, and the diameter of this ball is such that it is displaceable between the discs for selective seating in one of the openings to couple thereby the orifices selectively. The invention further contemplates the provision of second and third balls freely movable in the openings for engaging the first ball. A spring connected to said body engages one of the balls for urging all of the balls in one direction through the bore. An electromagnetic device is employed to engage another of the balls for selectively opposing the action of the spring. The action of the spring and of the electromagnetic device is employed to achieve the aforenoted selective seating.

The invention will be more readily comprehended from the following detailed description which will indicate other objects and features of the invention and which is illustrated in the accompanying drawing, in which.

Figure 1:
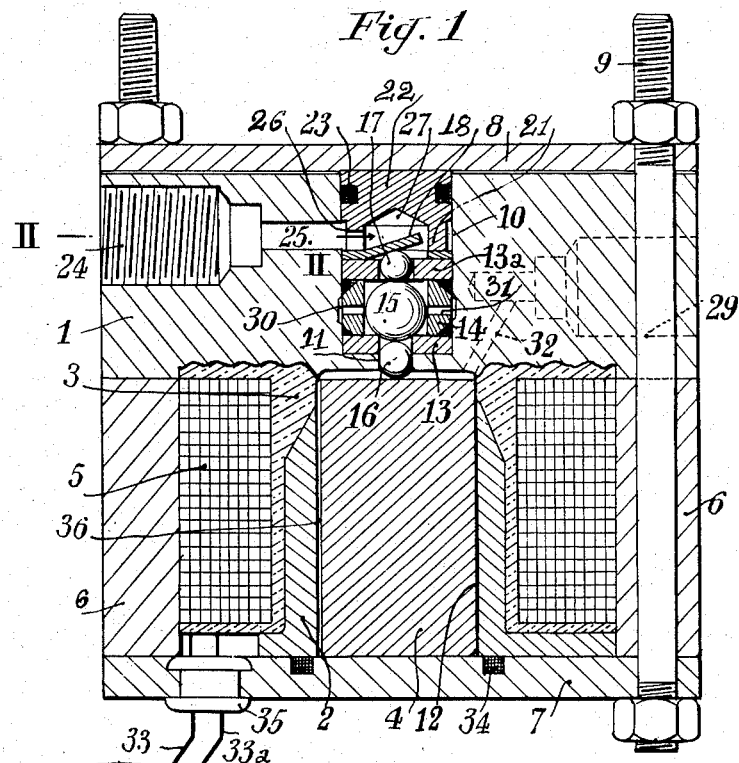
Fig. 1 is a view, in axial cross-section, of a valve arrangement provided in accordance with an embodiment of the invention.
Figure 2:
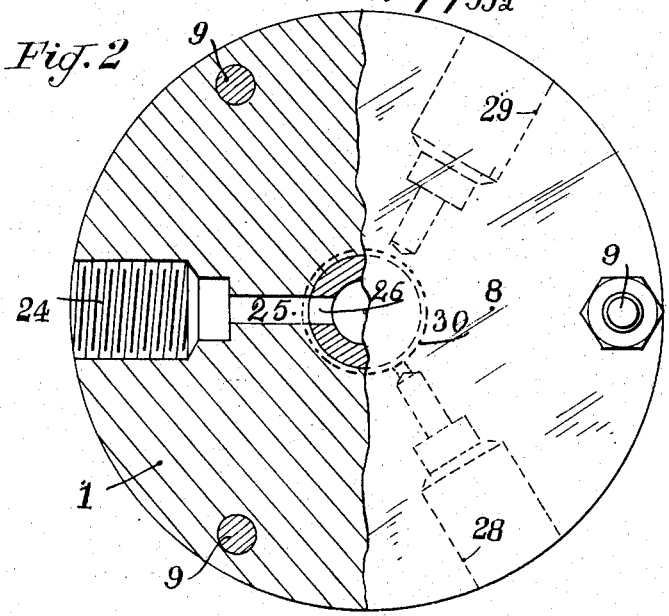
Fig. 2 is a view, half in plan and half in cross-section, taken along line II—II of Fig. 1.
Figure 3:
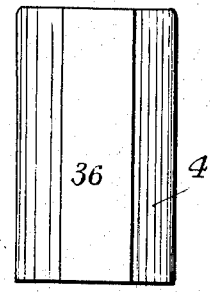
Figs. 3 and 4 are, respectively, elevational and end views of the core of an associated electro-magnet.

The electro-valve comprises a frame including members 1, 2 and 3, in which is housed a magnetic core 4 and around which is arranged a winding 5 which is itself surrounded by a cylindrical body 6. These members are gripped between two plates 7 and 8 by three bolts 9 which pass through the assembly.

The co-axial cylindrical metal members 1 and 2 are joined together by the moulding of the insulating member 3. These members 1 and 2 are preferably of iron, the first being, for example, of calcined iron and the second of pure iron. The member 1 has an axial bore 10 which forms a ball valve casing, the bottom of which defines an axial orifice 11 leading into the cylindrical cavity 12 which forms a well in which is housed the core.

Figure 5:
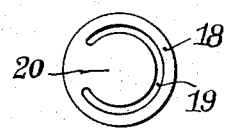
Figs. 5 and 6 are, respectively, a plan view and a view in cross-section of the spring of the valve.
Figure 4:
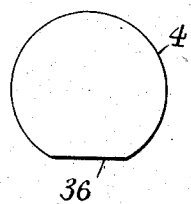
Figure 6:

In the bore 10 are superposed a ring 13, a spacing member 14 and a ring 13a. The rings 13 and 13a, form the seatings for a common ball-valve constituted by a ball 15 moving in the bore of the spacing member 14, the diameter of which is greater than that of the bore of the rings 13 and 13a. In the latter bore are housed balls 16 and 17. Above the seating 13a is disposed a plate 18, the detail of which is given in Figs. 5 and 6. This plate is preferably of beryllium bronze and has a circular slot 19 which extends over about three quarters of its circumference, thus giving a certain amount of elasticity to the central portion 20. This plate-spring is gripped along its edge by the lower extremity 21 of a plug 22 which is held in position by the plate 8. The closure is made fluid-tight by a packing 23.

A supply orifice 24 leads through a conduit 25 and a passage 26 formed in the plug into the cavity 27 of the plug member. At 120° from the axis of the admission orifice 24, there are provided, at a lower level, a utilization orifice 28 and a return orifice 29. The utilization orifice 28 delivers into an annular chamber 30 located in the body 1 around the spacing ring 14. The latter is formed with two bevelled portions at 45° to provide a housing for two sealing rings which insure the fluid-tightness of the annular chamber 30 which communicates with the bore of the spacer 14 through the radial channels 31.

The return orifice 29 communicates through an oblique conduit 32 with the well 12 which is made fluid-tight by means of the packing 34. The input and output extremities of a coil winding, shown at 33 and 33a, pass through the insulating plug 35.

The electro-valve operates in the following manner:

When no current passes through the coil 5, the core 4 rests on the base plate 7; the plate spring 20 rests on the ball 17 which presses in its turn on the non-return ball 15, which thus closes the bore of the seating of the ball valve 13. Fluid under pressure passes through the orifice 24 and the conduit 25 into the chamber 27. Passing around the ball 17 and the ball 15 in the bore of the spacing member 14, and then through the passages 31, the fluid passes into the annular chamber 30 and from this chamber to the utilization orifice 28.

If, on the other hand, the coil 5 is energized, the core 4 is attracted upwards and pushes the ball 16 which raises the ball-valve 15 from its lower seating 13 and forces it against its upper seating 13a, which is thus closed. As a consequence, the fluid pressure is no longer admitted into the spacing member 14. On the other hand, the utilization orifice 28 is put in communication by the annular space 30, the well 12 and the conduit 32 with the return orifice 29.

During the movements of the core 4, it is essential that the fluid should pass from one face of this core to the other. To this end, a projecting strip is formed on the core parallel to its axis.

I claim:

1. An electro-valve distributor for selectively coupling first, second, and third orifices comprising a body defining a bore having opposite extremities coupled to the first and second orifices and a central portion coupled to the third orifice, spaced discs in said bore on opposite sides of said third orifice and defining substantially aligned circular openings, a first ball in said bore between the discs and having a diameter exceeding the diameters of the openings, the diameter of said first ball being such that said ball is displaceable between the discs for selective seating in one of the openings for selectively coupling the orifices, second and third balls freely movable in said openings for engaging said first ball, a spring coupled to said body and engaging one of the balls in the openings for urging all of said balls in one direction through the bore to seat the first ball in one of said openings, and an electro-magnetic device engaging the other of the balls in said openings for selectively opposing the action of said spring to seat said first ball in the other of said openings.

2. A distributor as claimed in claim 1 wherein the spring is a disc in the bore and concentric with said discs, said spring being provided with an arcuate slot dividing the spring into a peripheral portion and a central displaceable portion engaging said one ball.

3. A distributor as claimed in claim 1 comprising a spacer in the bore for spacing said discs, said spacer having a central bore accommodating said first ball and a radial opening coupling the central bore with said third orifice.

References Cited in the file of this patent

UNITED STATES PATENTS

| | | |
|---|---|---|
| 834,626 | Longacre | Oct. 30, 1906 |
| 1,649,900 | Holdsworth | Nov. 22, 1927 |
| 2,467,533 | Martin | Apr. 19, 1949 |
| 2,608,995 | Gardner | Sept. 2, 1952 |
| 2,619,986 | Goepfrich | Dec. 2, 1952 |
| 2,633,711 | Torrence | Apr. 7, 1953 |
| 2,700,986 | Guinn | Feb. 1, 1955 |
| 2,714,874 | Hart | Aug. 9, 1955 |

FOREIGN PATENTS

| | | |
|---|---|---|
| 852,474 | France | Oct. 30, 1939 |